US008744152B2

(12) United States Patent
Beymer et al.

(10) Patent No.: US 8,744,152 B2
(45) Date of Patent: *Jun. 3, 2014

(54) ECHOCARDIOGRAM VIEW CLASSIFICATION USING EDGE FILTERED SCALE-INVARIANT MOTION FEATURES

(75) Inventors: David J. Beymer, San Jose, CA (US); Ritwik K. Kumar, Cambridge, MA (US); Tanveer F. Syeda-Mahmood, Cupertino, CA (US); Fei Wang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/560,496

(22) Filed: Jul. 27, 2012

(65) Prior Publication Data

US 2012/0288171 A1 Nov. 15, 2012

Related U.S. Application Data

(63) Continuation of application No. 12/819,183, filed on Jun. 19, 2010.

(51) Int. Cl.
*H04N 7/12* (2006.01)
*H04N 11/02* (2006.01)
*H04N 11/04* (2006.01)
*G06K 9/00* (2006.01)

(52) U.S. Cl.
USPC ............. 382/128; 375/E07.026; 375/240.08

(58) Field of Classification Search
USPC ...................................................... 375/240
See application file for complete search history.

(56) References Cited

U.S. PATENT DOCUMENTS

| 2002/0007117 | A1 | 1/2002 | Ebadollahi et al. |
| 2003/0153823 | A1 | 8/2003 | Geiser et al. |
| 2003/0212666 | A1* | 11/2003 | Basu et al. ................. 707/3 |
| 2005/0004617 | A1* | 1/2005 | Dawant et al. .............. 607/45 |

(Continued)

FOREIGN PATENT DOCUMENTS

WO 2006011891 A1 2/2006

OTHER PUBLICATIONS

Kumar et al., "Echocardiogram View Classification Using Edge Filtered Scale-Invariant Motion Features," 2009 IEEE Computer Society Conference on Computer Vision and Pattern Recognition Workshop, Jun. 2009, pp. 1-8.

(Continued)

*Primary Examiner* — Dave Czekaj
*Assistant Examiner* — Nam Pham
(74) *Attorney, Agent, or Firm* — Cantor Colburn LLP; Yusuke Kanehira

(57) ABSTRACT

According to one embodiment of the present invention, a method for echocardiogram view classification is provided. According to one embodiment of the present invention, a method comprises: obtaining a plurality of video images of a subject; aligning the plurality images; using the aligned images to generate a motion magnitude image; filtering the motion magnitude image using an edge map on image intensity; detecting features on the motion magnitude image, retaining only those features which lie in the neighborhood of intensity edges; encoding the remaining features by generating, x, y image coordinates, a motion magnitude histogram in a window around the feature point, and a histogram of intensity values near the feature point; and using the encoded features to classify the video images of the subject into a predetermined classification.

16 Claims, 11 Drawing Sheets

(56) References Cited

U.S. PATENT DOCUMENTS

| | | | |
|---|---|---|---|
| 2005/0094898 A1* | 5/2005 | Xu et al. | 382/294 |
| 2006/0064017 A1* | 3/2006 | Krishnan et al. | 600/450 |
| 2007/0055153 A1 | 3/2007 | Simopoulos et al. | |
| 2007/0237372 A1* | 10/2007 | Chen et al. | 382/128 |
| 2008/0069436 A1* | 3/2008 | Orderud | 382/154 |
| 2008/0281203 A1 | 11/2008 | Zhou et al. | |
| 2008/0292194 A1* | 11/2008 | Schmidt et al. | 382/217 |
| 2009/0034808 A1 | 2/2009 | Zhou et al. | |
| 2009/0088640 A1 | 4/2009 | Park et al. | |
| 2010/0195881 A1* | 8/2010 | Orderud et al. | 382/131 |
| 2010/0232665 A1* | 9/2010 | Amir | 382/131 |

OTHER PUBLICATIONS

K. Grauman and T. Darrell, "Approximate Correspondences in High Dimensions," NIPS, 2006, pp. 1-8.

A. Guimond et al., "Three-Dimensional Multimodal Brain Warping Using the Demons Algorithm and Adaptive Intensity Corrections," IEEE Trans. on Medical Imaging, 20 (1), pp. 58-69, 2001.

H. Jhuang et al., "A biologically Inspired System for Action Recognition," ICCV, 2007; pp. 1-8.

Y. Ke et al., "Efficient Visual Event Detection Using Volumetric Features," ICCV, 2005, pp. 1-9.

I. Laptev, "On Space-time Interest Points," IJCV, 64(2/3), pp. 107-123, 2005.

I. Laptev et al., "Learning Realistic Human Actions from Movies," CVPR, 2008, pp. 1-8.

D. G. Lowe, "Distinctive Image Features from Scale-invariant Key Points," IJCV, 60 (2), pp. 91-110, 2004.

M. Otey et al., "Automatic View Recognition for Cardiac Ultrasound Images," In MICCAI: Intl Workshop on Computer Vision for Intravascular and Intracardiac Imaging, pp. 187-194, 2006.

J. Park et al., "Automatic Cardiac View Classification of Echocardiogram," In ICCV, pp. 1-8, 2007.

A. Roy et al., "State-based Modeling and Object Extraction from Echocardiogram Video," IEEE Transactions on Information Technology in Biomedicine, 12 (3), pp. 366-376, 2008.

H. Sidenbladh and M. J. Black, "Learning the Statistics of People in Images and Videos," IJCV, 54, 2003, pp. 1-27.

S. Zhou et al., "Image-based Multiclass Boosting and Echocardiographic View Classification," CVPR, pp. 1559-1565, 2006.

S. Aschkenasy et al., "Unsupervised Image Classification of Medical Ultrasound Data by Multiresolution Elastic Registration," Ultrasound in Medicine and Biology, 32 (7); pp. 1047-1054, 2006.

D. R. Bailes, "The Use of the Gray Level Sat to Find the Salient Cavities in Echocardiograms," Journal of Visual Communication and Image Representation, 7 (2), pp. 169-195, 1996.

D. Beymer et al., "Exploiting Spatio-Temporal Information for View Recognition in Cardiac Echo Videos," IEEE Computer Society Workshop on Mathematical Methods in Biomedical Image Analysis, pp. 1-8, 2008.

N. Dalal et al., "Human Detection Using Oriented Histograms of Flow and Apperance," ECCV, 2006, pp. 1-14.

P. Dollar et al., "Behavior Recognition Via Sparse Spatio-Temporal Features," 2nd Joint IEEE International Workshop on Visual Surveillance and Performance Evaluation of Tracking and Surveillance, 2005, pp. 1-8.

Ebadollahi et al., "Automatic View Recognition in Echocardiogram Videos Using Partsbased Representation," CVPR, pp. 2-9, 2004.

A. A. Efros et al., "Recognizing Action at a Distance," ICCV, 2003, pp. 1-8.

David Beymer and Tanveer Syeda-Mahmood, "Cardiac Disease Recognition in Echocardiograms Using Spatio-temporal Statistical Models," Engineering in Medicine and Biology Society, IEEE, 2008, pp. 1-5.

Ritwik Kumar et al., "Cardiac Disease Detection from Echocardiogram using Edge Filtered Scale-invariant Motion Features," Computer Vision and Pattern Recognition Workshops, IEEE, 2010, pp. 1-8.

International Search Report; International Application No. PCT/EP2011/059261; International Filing Date: Jun. 6, 2011; Date of Mailing: Jul. 28, 2011, pp. 1-4.

International Search Report—Written Opinion; International Application No. PCT/EP2011/059261; International Filing Date: Jun. 6, 2011; Date of Mailing: Jul. 28, 2011, pp. 1-5.

F. Wang et al., "Spatio-Temporal Motion Estimation for Disease Discrimination in Cardiac Echo Videos," Computers in Cardiology; IEEE, 2008, pp. 1-4.

K. Grauman et al., "The Pyramid Match Kernel: Discriminative Classification with Sets of Image Features," In Proceedings of the IEEE International Conference on Computer Vision, China, pp. 1-8, 2005.

Office Action—Non-Final for U.S. Appl. No. 12/819,183, filed Jun. 19, 2010; First Named Inventor: David James Beymer; Mailing Date: Mar. 6, 2013; 30 pages.

Office Action—Non-Final for U.S. Appl. No. 12/819,183, filed Jun. 19, 2010; First Named Inventor: David James Beymer; Mailing Date: Oct. 5, 2012; 24 pages.

* cited by examiner

| Algorithm 1: View Classification Training |
|---|

Input: Labeled Training Echocardiogram Videos: *trainSet*, Neighborhood Size: *nh*, Number of Frames: *n*
Output: SVM Parameters: *M*, Feature Dictionary: *D*

1. Pick a reference frame and detect its 3 anchor points
2. foreach *Video V ∈ trainSet* do
3.     $F_v$ = { *n* equidistant frames ∈ *V*}
4.     foreach *frame f ∈ $F_v$* do
5.         Feature Set for *f*, $FS_v^f$ = {}.
6.         Extract Region of Interest (ROI).
7.         Detect the 3 anchor points.
8.         Compute Affine matrix w.r.t reference frame.
9.         Apply the affine matrix and align ROI.
10.        $M_v^f$ = Optical Flow w.r.t next frame in sequence. [10]
11.        $E_v^f$ = Edge map of *f*.
12.        $Mag = \|M_v^f\|_2$. (Motion Magnitude)
13.        $FT$ = {Scale invariant features in *Mag* [15]}.
14.        foreach *Feature i ∈ FT* do
15.            $Loc = (x,y)$ coordinate of *i*.
16.            if *Loc ∈ nh × nh neighborhood of some edge ∈ $E_v^f$* then
17.                $T_{Hist}$ = histogram of *nh × nh* intensity neighborhood of *i*.
18.                $M_{Hist}$ = histogram of *nh × nh* motion magnitude neighborhood of *i*.
19.                $FT_{Vec}^i = concat(Loc, T_{Hist}, M_{Hist})$.
20.            $FS_v^f = FS_v^f \cup \{FT_{Vec}^i\}$ 21. Learn Dictionary, *D*, from $\cup_v \cup_j FS_v^f$ [9].
22. Learn SVM parameters *M* using $FS_v^f$, *D* & PMK [9].

FIG. 6

Algorithm 2: View Classification Algorithm

Input: Learnt SVM Model: $M$, Test Echocardiogram Videos: $testVideo$, Dictionary:$D$
    Neighborhood Size: $nh$, Number of Frames: $n$ 1  $F_{testVideo} = \{n \text{ equidistant frames} \in testVideo\}$
2  $vote = zeros(numberOfPossibleViews)$.
3  foreach $frame\ f \in F_{testVideo}$ do
4      Compute $FS^{f}_{testVideo}$ as described in Alg. 1.
5      Classify $f$ using $FS^{f}_{testVideo}$, SVM $M$ and $D$.
6      $class(f)$ = view obtained by classification.
7      $vote(class(f)) = vote(class(f)) + 1$.

8  Classify $testVideo$ as $argmax_{view}\{vote(view)\}$.

FIG. 7

| View | Videos | Frames | View | Videos | Frames |
|------|--------|--------|------|--------|--------|
| A2C | 11 | 237 | PLA | 18 | 384 |
| A3C | 6 | 129 | PSAB | 12 | 271 |
| A4C | 26 | 597 | PSAP | 16 | 370 |
| A5C | 11 | 209 | PSAM | 13 | 237 |
| Total Videos: 113, Total Frames: 2470 ||||||

FIG. 8

| Method/Views | A4C | PLA | PBAB | PSAP | ALL |
|---|---|---|---|---|---|
| ICCV 2005, SIFT+PMK [8] | 59.3 | 65.5 | 47.4 | 73.2 | 62.0 |
| ICCV 2007, ML-Boosting [17] | 80.3 | 75.5 | 67.5 | 70.9 | 74.9 |
| MMBIA 2008, ASM+Motion [3] | 96.2 | 88.9 | 91.6 | 75.0 | 88.9 |
| Our Method | 96.2 | 98.9 | 100.0 | 100.0 | 98.4 |

FIG. 9

|       | A4C  | PLA  | PSAB | PSAP | A2C  | A3C  | A5C  | PSAM |
|-------|------|------|------|------|------|------|------|------|
| A4C   | 0.93 | 0.03 | 0.00 | 0.03 | 0.00 | 0.00 | 0.00 | 0.01 |
| PLA   | 0.00 | 0.88 | 0.00 | 0.03 | 0.00 | 0.00 | 0.00 | 0.09 |
| PSAB  | 0.00 | 0.00 | 1.00 | 0.00 | 0.00 | 0.00 | 0.00 | 0.00 |
| PSAP  | 0.00 | 0.00 | 0.06 | 0.93 | 0.00 | 0.00 | 0.00 | 0.00 |
| A2C   | 0.08 | 0.00 | 0.06 | 0.04 | 0.51 | 0.12 | 0.10 | 0.04 |
| A3C   | 0.09 | 0.00 | 0.07 | 0.00 | 0.20 | 0.51 | 0.00 | 0.10 |
| A5C   | 0.19 | 0.04 | 0.00 | 0.00 | 0.15 | 0.00 | 0.51 | 0.01 |
| PSAM  | 0.00 | 0.13 | 0.07 | 0.07 | 0.01 | 0.01 | 0.00 | 0.71 |

FIG. 10

ECHOCARDIOGRAM VIEW CLASSIFICATION USING EDGE FILTERED SCALE-INVARIANT MOTION FEATURES

CROSS-REFERENCE TO RELATED APPLICATION

This application is a continuation of U.S. patent application Ser. No. 12/819,183, filed Jun. 19, 2010, the disclosure of which is incorporated by reference herein in its entirety.

BACKGROUND

The present invention relates to image classification problems, and more specifically, to techniques for classifying echocardiogram videos.

Echocardiography is an important diagnostic aid in cardiology for the morphological and functional assessment of the heart. During an echocardiogram exam, a sonographer images the heart using ultrasound by placing a transducer against the patient's chest. Reflected sound waves reveal the inner structure of the heart walls and the velocities of blood flows. Since these measurements are typically made using 2D slices of the heart, the transducer position is varied during an echo exam to capture different anatomical sections of the heart from different viewpoints.

In current clinical practice, transducer positioning and viewpoint capture requires manual intervention in both imaging and in interpretation. The sonographer manually delineates major anatomical structures like Left Ventricle (LV) and computes numerical quantities like ejection fraction from the images. This data is examined further by a cardiologist who makes the diagnosis based on the interpretation made from the echocardiogram. The knowledge of the probe viewpoint plays a crucial role in the interpretation process as it tells the examiner what exactly is he or she looking at.

SUMMARY

According to one embodiment of the present invention, a method comprises: obtaining a plurality of video images of a subject; aligning the plurality images; using the aligned images to generate a motion magnitude image; filtering the motion magnitude image using an edge map on image intensity; detecting features on the motion magnitude image, retaining only those features which lie in the neighborhood of intensity edges; encoding the remaining features by generating, x, y image coordinates, a motion magnitude histogram in a window around the feature point, and a histogram of intensity values near the feature point; and using the encoded features to classify the video images of the subject into a predetermined classification.

According to one embodiment of the present invention, a method of classifying at least one echocardiogram video including a plurality of echo images comprises: detecting an edge map of at least one of the echo images; modifying at least one of the echo images to produce an edge filtered motion magnitude image; locating the features at scale invariant points in the edge filtered motion magnitude image; and encoding the edge filtered motion magnitude image by using local information about the image at the scale invariant point locations.

According to another embodiment of the present invention, a system is provided for processing a plurality of video images of a subject comprising: a processor for: aligning the plurality images; using the aligned images to generate a motion magnitude image; filtering the motion magnitude image using an edge map on image intensity; detecting features on the motion magnitude image, retaining only those features which lie in the neighborhood of intensity edges; encoding the remaining features by generating, x, y image coordinates, a motion magnitude histogram in a window around the feature point, and a histogram of intensity values near the feature point; and using the encoded features to classify the video images of the subject into a predetermined classification.

According to another embodiment of the present invention, a computer program product for echocardiogram view classification comprises: a computer usable medium having computer usable program code embodied therewith, the computer usable program code comprising: computer usable program code configured to: obtain a plurality of video images of a subject; align the plurality images; use the aligned images to generate a motion magnitude image; filter the motion magnitude image using an edge map on image intensity; detect features on the motion magnitude image, retaining only those features which lie in the neighborhood of intensity edges; encode the remaining features by generating, x, y image coordinates, a motion magnitude histogram in a window around the feature point, and a histogram of intensity values near the feature point; and use the encoded features to classify the video images of the subject into a predetermined classification.

BRIEF DESCRIPTION OF THE SEVERAL VIEWS OF THE DRAWINGS

FIG. 6 shows a view classification training process in accordance with an embodiment of the invention;

FIG. 7 shows a view classification process in accordance with an embodiment of the invention;

FIG. 8 shows a Table summarizing a database of echocardiogram videos used for experiments in accordance with an embodiment of the invention;

FIG. 9 shows a Table summarizing recognition rates for echocardiogram videos during experiments in accordance with an embodiment of the invention;

FIG. 10 shows a confusion matrix for eight-way view classification in accordance with an embodiment of the invention;

DETAILED DESCRIPTION

Embodiments of the invention provide ways to improve the automatic classification of viewpoints of echocardiogram videos. As discussed above, classification of echocardiogram viewpoints is currently generally done manually. In the last few years, there has been tremendous progress in the field of cardiac view recognition in echocardiograms and similarity search based decision support systems for cardiology. The primary focus in such systems is to be able to automatically detect features from the echocardiogram video which can then be used to conduct higher level disease discrimination and similarity search. Hence, the automatic echocardiogram view classification, the first step in any such system, has gained importance. Being primarily an image based classification problem, it has attracted considerable attention from the computer vision and pattern recognition community.

Embodiments of the invention address the problem of automatically assigning view labels to echo videos obtained from unknown viewpoints. This problem is hard because even for videos belonging to same viewpoint, significant variation arises from differences in pathologies, patients, instruments, and sonographers' expertise. The problem is complicated further by the fact that the images obtained by echocardiogram generally have high noise and low contrast. Furthermore, even for videos belonging to different viewpoints, its not trivial to label the viewpoints, and experts like cardiologists and cardiac sonographers are usually required to do this. In addition to this, obtained images can be translated, rotated or zoomed with respect to others.

1. Introduction

Figure 1:
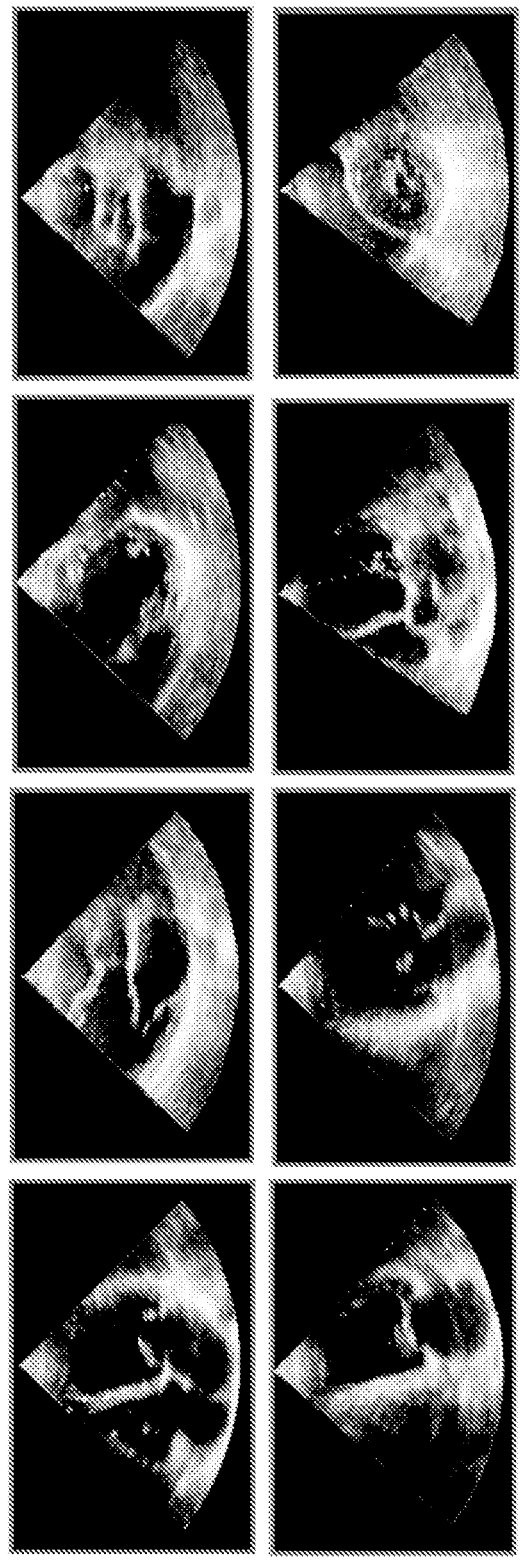
FIG. 1 shows diagrams representing echocardiograms seen from different viewpoints.

A key component in any view classification system is one of representation—what feature set is used to represent a video? It is well-known in the pattern recognition community, for example, that the proper choice of feature representation has a greater impact on performance than selecting among the top network architectures. Embodiments of the invention employ a view classification approach that uses a state-of-the-art classifier, vocabulary-based PMK and multiclass SVMs, and pairs it with a novel and powerful set of motion and edge-based features. In embodiments of the invention, interest points are scale-invariant points in the motion magnitude map that are also near intensity edges. This combination of motion and intensity features allows these embodiments to select the important portions of echo cardiac anatomy to make the classification stage a success. The eight viewpoints classified by our system are shown in FIG. 1, which shows some of the more common viewpoints captured during an echocardiogram exam. In particular, these images in clockwise order from top left are: Apical Four Chamber (A4C), Parasternal Long Axis (PLA), Parasternal Short Axis-Basal (PSAB), Parasternal Short Axis-Papillary (PSAP), Apical Two Chambers (A2C), Apical Three Chambers (A3C), Apical Five Chambers (A5C), and Parasternal Short Axis-Mitral (PSAM).

2. Prior Systems

In an early first automatic cardiac view recognition system, Ebadollahi et al. in Ebadollahi, S. Chang, and H. Wu., "Automatic view recognition in echocardiogram videos using parts-based representation. CVPR, pages 2-9, 2004, proposed a constellation-of-parts based method. They used a generic heart chamber detector (see D. R. Bailes, "The use of the gray level sat to find the salient cavities in echocardiograms," Journal of Visual Communication and Image Representation, 7(2):169-195, 1996) to locate heart chambers, and they represented the spatial arrangement of the chambers using a Markov Random Field (MRF) based relational graph. Final classification of a test image was performed using a Support Vector Machine on MRF network output. This method suffers from sensitivity of the chamber detection method to frequently present noise in the echocardiogram images while demonstrating limited robustness to basic image transformations.

Aschkenasy et al. represented each view by a signature obtained by multi-resolution spline filtering of the training images. (See S. Aschkenasy, C. Jansen, R. Osterwalder, A. Linka, M. Unser, S. Marsch, and P. Hunziker, "Unsupervised image classification of medical ultrasound data by multiresolution elastic registration," Ultrasound in Medicine and Biology, 32(7):1047-1054, 2006.) For a test image, these templates were elastically deformed and the deformation energy, along with similarity, were used to classify the test image using a linear discriminant. Drawbacks of this method include the use of a classifier with limited discrimination ability as well as the use of features which are accurate only when the test image and template are close to one another.

Zhou et al. cast view recognition as a multi-class object detection problem. (See S. Zhou, J. Park, B. Georgescu, J. Simopoulos, J. Otsuki, and D. Comaniciu, "Image-based multiclass boosting and echocardiographic view classification," CVPR, pages 1559-1565, 2006.) Using a multi-class LogitBoost network, this work exploited both positive examples corresponding to viewpoint along with negatives corresponding to background. The use of Haar-like rectangular features, however, makes the method sensitive to presence of noise in the images. Further, the large number of Haar-like features necessitated pruning and high recognition rates were only guaranteed when sophisticated methods were included to handle contradicting recognition results. Results for only two-view classification were presented in this paper.

Otey et al. proposed a hierarchical classification strategy for view classification where first a classification into corresponding view type (e.g. Apical, Parasternal, etc.) was made, followed by a final view classification within the type. (See M. Otey, J. Bi, S. Krishna, B. Rao, J. Stoeckel, A. S. Katz, J. Han, and S. Parthasarathy, "Automatic view recognition for cardiac ultrasound images," In MICCAI: Intl Workshop on Computer Vision for Intravascular and Intracardiac Imaging, pages 187-194, 2006.) Features included gradient, peak, raw pixels and other statistical features, which were then fed to dimensionality reduction stage. The final classification was made using Logistic Model Tree classifier at both levels.

Park et al. revisited boosting for view classification, where they used the MLBoost learning algorithm along with multi-object detection and integrated local-global features. (See J. Park, S. Zhou, C. Simopoulos, J. Otsuki, and D. Comaniciu, "Automatic cardiac view classification of echocardiogram," In ICCV, pages 1-8, 2007.) Their system was built around a Haar-like feature based Left Ventricle (LV) region detector, and each view was modeled according to the spatial layout of other heart chambers with respect to the LV region. In this system, test images were classified based on their spatial region layout with respect to the template region layouts. View classification is made based on a key frame from the given echo video, the end diastolic frame. This method cannot be used to detect views in which LV region is absent.

Roy et al. proposed the use of simple intensity histograms for view classification. (See A. Roy, S. Sural, J. Mukherjee, and A. K. Majumdar, "State-based modeling and object extraction from echocardiogram video," IEEE Transactions on Information Technology in Biomedicine, 12(3):366-376, 2008.) They reasoned that as different regions and chambers are visible in different echo viewpoints, the intensity distribution can help discriminate viewpoint. The final classification was made using a multilayer perceptron where the number of hidden layer units was empirically chosen. The signature histogram for a given echo image is heavily dependent on the region of interest for which intensity values are considered and the choice of this region is not made explicit in this work.

Most recently, Beymer et al., for the first time, proposed to exploit the motion information present in the echocardiogram videos for view classification. (See D. Beymer, T. Syeda-Mahmood, and F. Wang, "Exploiting spatio-temporal information for view recognition in cardiac echo videos," IEEE Computer Society Workshop on Mathematical Methods in Biomedical Image Analysis (MMBIA), pages 1-8, 2008. They used Active Shape Models (ASMs) to capture the shape and texture information and then tracked these across different frames to derive motion information. All the information is concentrated by projecting it down to low variance eigenspaces and the final classification is done by minimizing a "sequence fit" measure. One of the downsides of this technique is that ASMs require manual delineation of shape in the training data, which can be time consuming. This work also presented a comparative study of some of the competing view classification methods.

The view recognition problem can also be looked at as an object recognition problem if we identify each view as a different object class. It has been purported that intraview variation observed in echocardiogram videos is too complicated for generic object recognition methods to handle (See Beymer et al.).

As compared to previous work in echo view recognition, embodiments of the invention achieve higher recognition rates and is more extensible. Compared to the 4-class recognition experiments in Park et al. and Beymer et al., the present embodiments' 4-class recognition accuracy is higher. Built on a scalable framework, the present embodiments do not require an initial LV detection stage as in Park et al., or an expensive manual labeling during training as in Beymer et al. Also, the present embodiments are the first to report good results on a larger 8-class viewpoint class experiment.

More generally, the present embodiments make an important contribution in its fusion of motion and intensity to form a discriminating "spatiotemporal" feature. As detailed in the following section, the features employed are unique both in their location and description. Feature locations are scale invariant interest points in motion magnitude that are also close to intensity edges. Feature descriptions include position (x, y) and histograms of local motion and intensity. The utility of these features is borne out through a comparison with the SIFT/PMK experiment in Beymer et al.

A survey of object, activity and scene recognition literature reveals that there have been attempts to use motion to define features but none has explored detecting and encoding features as we do. Jhuang et al. used a hierarchy of detectors for finding interest points, and one of stages in the system uses features based on filtering of optical flow. (See H. Jhuang, T. Serre, L. Wolf, and T. Poggio, "A biologically inspired system for action recognition," ICCV, 2007.) Sidenbladh and Black used motion features obtained from the time derivative of wrapped consecutive frames at multiple scales. (See H. Sidenbladh and M. J. Black, "Learning the statistics of people in images and video," IJCV, 54:54-1, 2003.)

Dalal et al. used oriented histogram of differential optical flow over the entire image but did not use optical flow to detect any interest points (See N. Dalal, B. Triggs, and C. Schmid, "Human detection using oriented histograms of flow and appearance," ECCV, 2006.), while Laptev et al. (see I. Laptev, M. Marszaek, C. Schmid, and B. Rozenfeld, "Learning realistic human actions from movies," CVPR, 2008) used the same histograms but at points detected using the techniques taught in I. Laptev, "On space-time interest points," IJCV, 2005. Efros et al. used rectified and blurred optical flow over the whole image for human detection, but motion is not used for interest point detection. (See A. A. Efros, A. C. Berg, G. Mori, and J. Malik, "Recognizing action at a distance," ICCV, 2003.) Ke et al. used volumetric spatio-temporal features for activity recognition. (See Y. Ke, R. Sukthankar, and M. Hebert, "Efficient visual event detection using volumetric features," ICCV, 2005.) Dollar et al. used histograms of x and y components of optical flow for encoding features but the interest point detection was done using Quadrature Gabor Filters. (See P. Dollar, V. Rabaud, G. Cottrell, and S. Belongie, "Behavior recognition via sparse spatio-temporal features," 2nd joint IEEE international workshop on visual surveillance and performance evaluation of tracking and surveillance," 2005.) Using scale invariant features detected on the edge filtered motion magnitude field has the distinct advantage of being able to locate anatomical features with significant motion, which these above methods lack. Further, since we use the histogram of motion magnitude to encode our feature vectors, locating them where motion is interesting makes sense.

3. Modeling Viewpoint Using Edge-filtered Motion Features

Since the native form of the data obtained from echocardiogram is a video of anatomical structures in motion, we ideally seek a model which exploits all the information (structural, textural and motion) present in video for viewpoint discrimination and is not limited to using a few key frames. Further, we want a method which can be seamlessly applied to any viewpoint and is not limited to any particular subset of viewpoints (like in Park et al.), and thus our technique should be independent of the presence of specific anatomical structures in the images. And finally, our technique should provide recognition rates which are competitive with respect to the existing state-of-the-art.

In order to satisfy these conditions, the present embodiments utilize a frame-work which works with a few salient features obtained from analysis of both intensity frames (structural and textural information) and optical flow (motion information) in a given video sequence. Below we describe the basic preprocessing and the two important aspects of salient feature selection process—localization and encoding.

In accordance with embodiments of the invention, echocardiogram videos undergo some basic preprocessing before we begin the process of feature point localization and encoding. This includes extraction of the fan sector (which contains the actual image) and a rough alignment. For extraction of the region of interest, either manual or template matching based automated technique can be used (or the method described in Otey et al.). Once the fan sector has been extracted, using the top, left and right extreme points, we automatically align all the echocardiogram videos with each other via an affine transform. The three points mentioned above are sufficient to compute the affine transformation matrix. Even though the classifier that we intend to use, PMK based SVM, is capable to handling small amount of image transformational discrepancies, this initial alignment improves the discrimination ability of our system.

In a given echocardiogram video of a heart cycle, there are image regions (corresponding to different anatomical structures) which demonstrate significant amount of motion and other regions which do not. Furthermore, these regions are disparate for different viewpoints while similar for image sequences belonging to same viewpoints. To characterize this information, we analyzed the optical flow for echocardiogram video sequences computed using Demons algorithm (See A. Guimond, A. Roche, N. Ayache, and J. Meunier, "Three-dimensional multimodal brain warping using the demons algorithm and adaptive intensity corrections," IEEE Trans. on Medical Imaging, 20(1):58-69, 2001).

Figure 2:
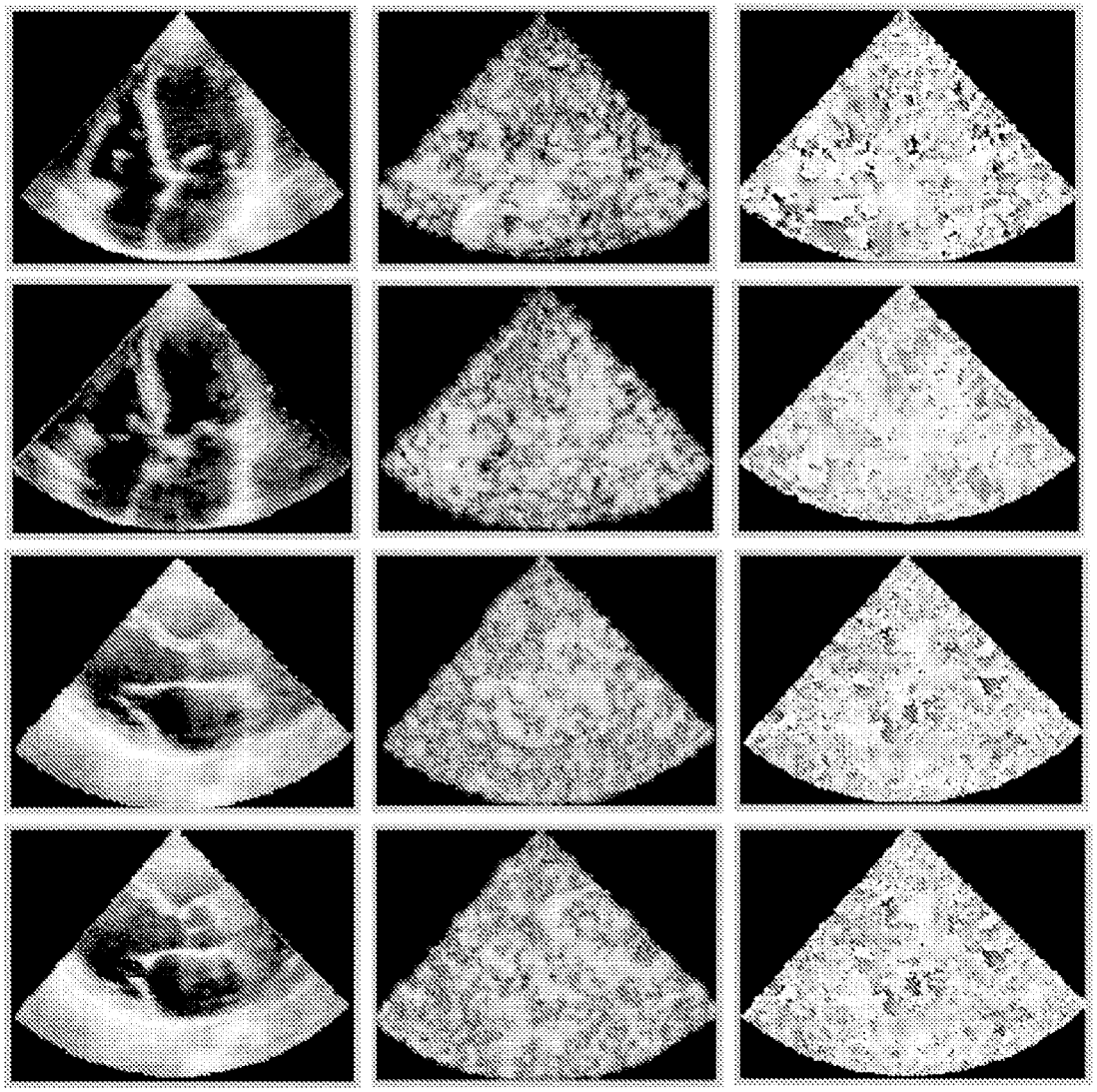
FIG. 2 shows diagrams representing echocardiograms seen from different viewpoints and processed to show intensity, motion magnitude, and phase in accordance with an embodiment of the invention.

Referring now to FIG. 2, the results of these computations are shown. In particular, the images in the first column of FIG. 2 show intensity images, the second and third columns show motion magnitude and phase from optical flow computed between the first column frames and the next video frame. The first two rows are Apical Four Chamber view while the last two are Parasternal Long Axis. For motion magnitude and phase images, brighter regions represent higher values. Intraclass similarity and interclass disparity can be readily noted in the motion magnitude images. All four rows belong to different patients. There are two important things to be noticed about the optical flow obtained for the echocardiogram image sequences shown in FIG. 2: 1) the deformation field contains a considerable amount of noisy motion (even after smoothing) as an artifact of the noise present in the intensity images, and 2) of the two components of the motion field—magnitude and phase, phase is sensitive to image transformations (rotation, translation etc) while magnitude is comparatively more stable.

Figure 3:
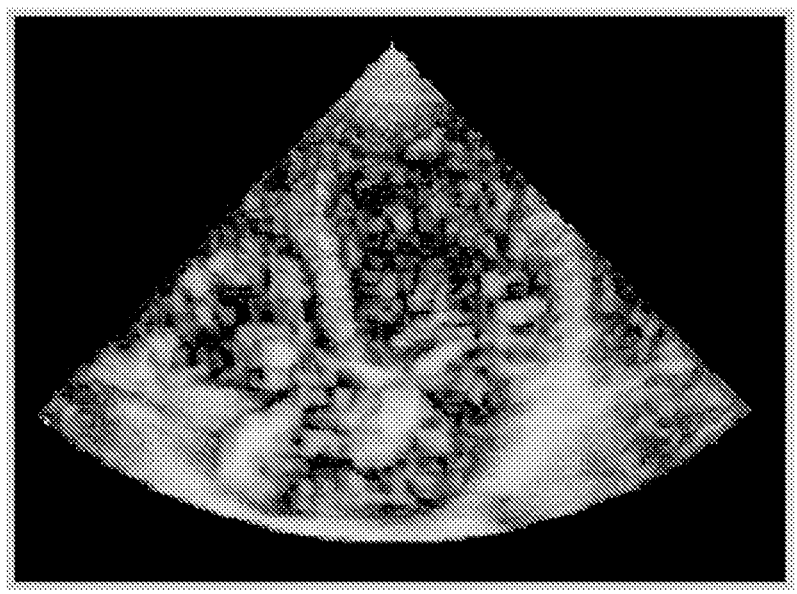
FIG. 3 shows a diagram representing an echocardiogram showing motion overlaid with intensity in accordance with an embodiment of the invention.

Choosing features on motion magnitude alone would select a number of weak features that follow erroneous motion and noise. Motion in echocardiogram images is meaningful only when it is associated with anatomical structures, and this information is absent in the motion magnitude images. This is shown in FIG. 3, where intensity image has been overlaid over the corresponding motion magnitude image. In particular, in FIG. 3, images from the top row, first two columns of FIG. 2 were overlaid (intensity is shown by the narrow vertical bright region just to the left of the center, by the bright region at the top center, and by the generally semicircular bright region extending from the two o-clock position and curving around to the seven o'clock position, while the remaining bright regions indicate motion). Significant motion (for example, as shown by the oblong blobs, one at the lower center and the other to the left of it) in the motion magnitude image corresponds to anatomical features like heart valves, while extraneous motion is localized to noise infested "blank" regions e.g. heart chambers.

Embodiments of the present invention use the structural information present in the intensity images to guide the feature localization process. To achieve this, the embodiments filter the motion magnitude images using an edge map on image intensity. Thus, only motion which corresponds to anatomical structures is retained while the remaining extraneous motion is disregarded.

Given these edge-filtered motion maps, the next step is to choose specific interest points. In the field of object recognition, much work exists on locating interest points (e.g. space time features (See I. Laptev, "On space-time interest points," IJCV, 2005.), scale-invariant features (See D. G. Lowe, "Distinctive image features from scale-invariant key points," IJCV, 60(2):91-110, 2004), etc). For the present embodiments we have chosen to use scale-invariant features primarily due to their simplicity and effectiveness. It should be noted that a direct application of these object recognition methods to echocardiogram images is largely ineffectual (as demonstrated by Beymer et al.) primarily due to low contrast and noise in echocardiogram images. To the best of our knowledge, the present embodiments are the first to exploit edge filtered motion magnitude images for obtaining discriminating features in either echocardiogram viewpoint or object recognition literature.

Figure 4:
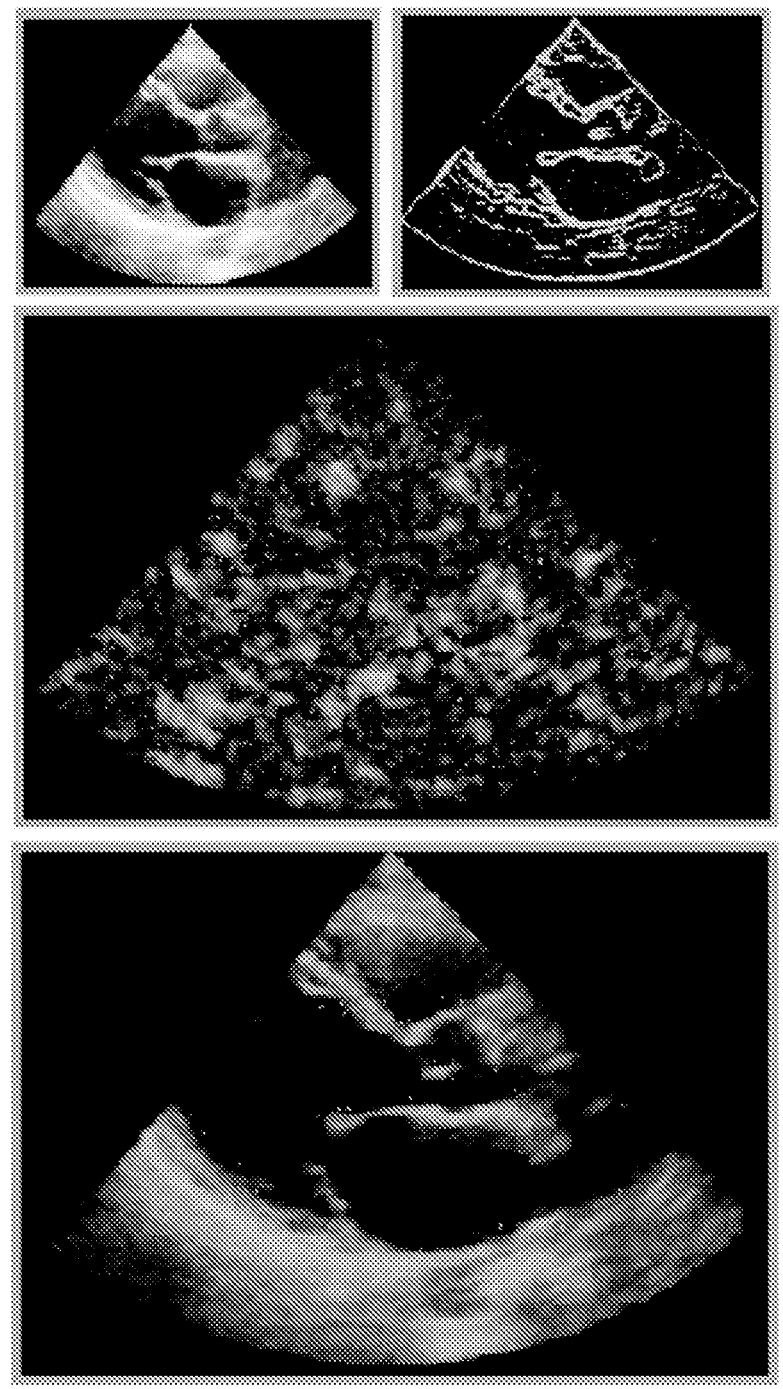
FIG. 4 shows diagrams representing echocardiograms processed to show edge maps, motion magnitude and edge map filtering in accordance with an embodiment of the invention.

Filtering the motion magnitude image using the edge map means that motion magnitude information only in the neighborhood of intensity edges is retained. As scale invariant features (See D. G. Lowe) are sensitive to edges in the image, we avoid features arising from artificial edges by first detecting features on the motion magnitude image and then retaining only those which lie in some neighborhood of the intensity edges. This process is demonstrated in FIG. 4, where the top row shows the echocardiogram frame and its edge map. The second row shows the motion magnitude corresponding to frame in the top row with detected feature points depicted as individual bright points. The bottom row shows the features filtered using the edge map. Note that, this process is not same as a mere sampling of the edges because the features points that we retain correspond to significant motion, and we will use this crucial information when we encode the features.

Once the features have been located, the next important step is to encode them using information which will be useful in discrimination. Foremost, the location itself is important information, so we want to include the (x, y) image coordinates of the feature in our description.

Next, in order to account for all important motion information, we include a histogram of motion magnitude in a window around the feature point in our description. Here we leave out the phase information because it is sensitive to common image transformations like rotation. The advantage of including motion magnitude information is that it can encode a certain amount of anatomical information (e.g. feature points around heart valves would have a motion magnitude histogram skewed towards higher values).

The structural information present in the intensity images is also important and we include it using a histogram of the intensity values in a neighborhood around the features point. Using histograms of both motion and texture information brings in robustness to possible presence of outliers in the actual values of texture and motion magnitude.

Figure 5:
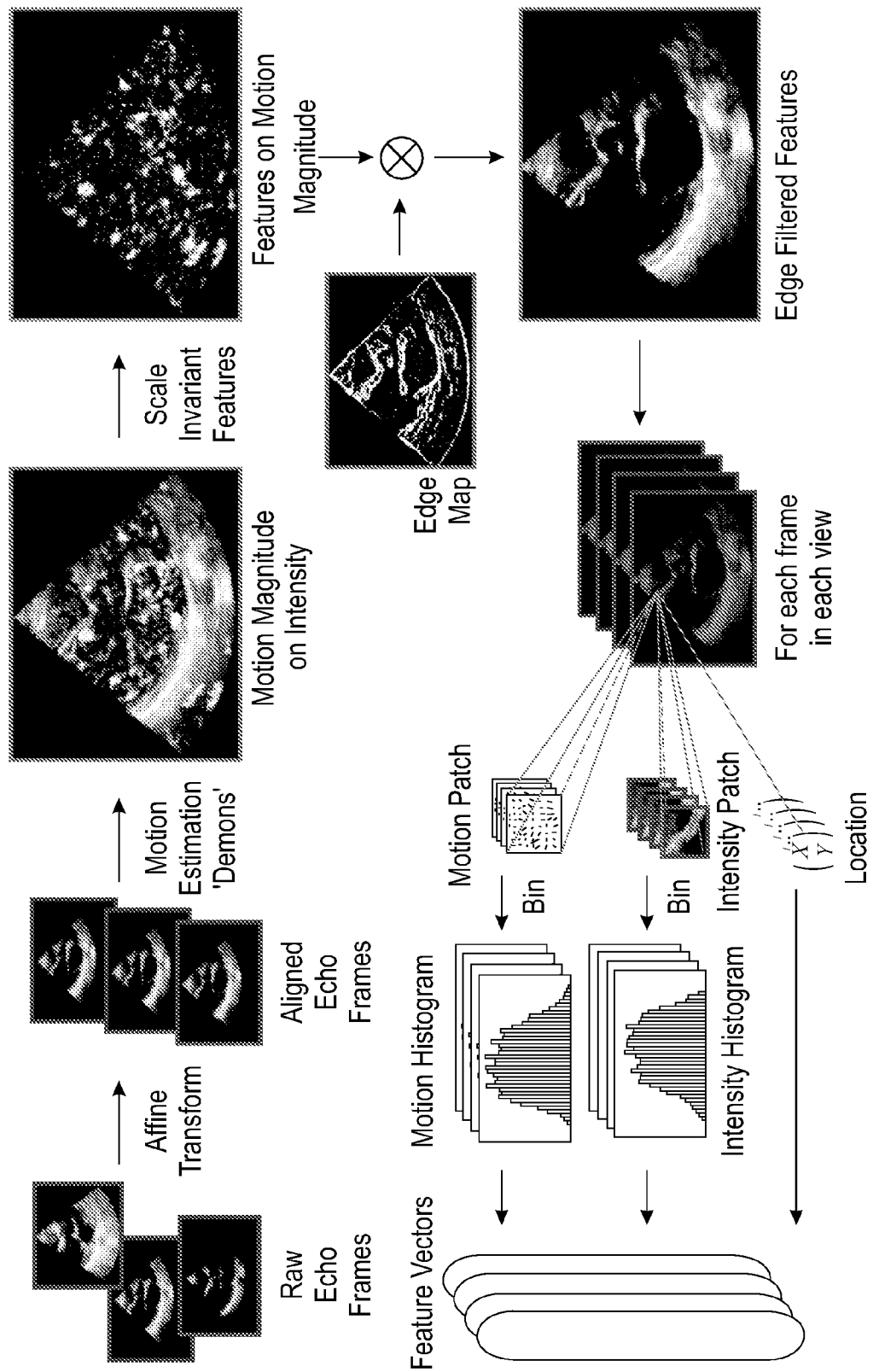
FIG. 5 shows diagrams representing the processing of echocardiograms in various stages in accordance with an embodiment of the invention.

Note that the scale invariant features (SIFT) (as described in D. G. Lowe, "Distinctive image features from scale-invariant keypoints," IJCV, 60(2):91-110, 2004.) also includes a method for feature description using oriented histograms of image gradients, but these are found to be in effectual for echocardiogram images (as gradients are too noisy). The present embodiments outperforms SIFT descriptors by a considerable margin, as described below in Section 5. The overall feature selection and description framework in accordance with an embodiment is presented in FIG. 5. As shown in FIG. 5, the feature location and description process according to an embodiment of the invention is shown. The frames of the training videos undergo affine alignment and then optical flow for each video is computed. Scale invariant features are detected from the magnitude of the optical flow and only those feature points which lie in vicinity of the intensity image edge are retained. The features are finally encoded using the location, local texture histogram and local motion magnitude histogram.

4. Training and Testing Algorithms

Once the salient features have been detected and encoded, an effective classification technique is required for viewpoint discrimination. Most of the existing methods use a single key frame from the echocardiogram video sequence for classification purpose while the embodiments achieve better performance by using more information than is present in the video sequence. The classification framework of embodiments of the invention uses as many frames per video sequence as desired. We classify each frame independently and each frame casts a vote towards a parent video classification. A given video sequence is assigned a class, which gets the maximum votes from the constituent frames. In case of a tie, re-classification is done only among tied classes. Empirically, we have noted that classifying the video randomly is equally effective, because the number of cases with ties are rare.

One advantage of this technique is that the crucial problem of key frame selection is resolved, as the frames we use are obtained by uniformly sampling the video sequence. Further, using multiple frames per video brings in some robustness to the classification process as misclassification by a few outlier frames is automatically discounted.

The training process in embodiments of the invention detects and encodes salient features for each frame in the training data. See Algorithm 1 shown in FIG. 6. Then, a hierarchical dictionary is learned from all the features in the system using non-uniform bins. This may employ the techniques described in K. Grauman and T. Darrell, "Approximate correspondences in high dimensions," NIPS, 2006. Next, the dictionary is used to learn the model parameters of a kernel-based SVM, which may employ the techniques taught in Grauman et al. A testing process detects and encodes the salient features in the given test video sequence in a similar manner as the training algorithm. In one embodiment this testing process uses Algorithm 2, as shown in FIG. 7. Then, using the learned dictionary and SVM, each frame is individually classified and final classification is made using the voting scheme described earlier.

Like any other learning based method, there are a few parameters that need to be set in the system. Here, we provide some meaningful heuristics that can be used to set these parameters. Foremost is the number of frames per video to be used for classification. We have noticed that as the number of frames increases so does the recognition rate, but at the expense of computation time, so this parameter should be set based on accuracy-efficiency trade-off. Next is the neighborhood size selection for edge filtering, motion and texture histogramming. Here we have noticed that a neighborhood size of around 10% of the ROI (rectangle containing image sector/fan) size provides the best result. This number is also used to set the number of bins in histograms.

Minor changes in this size does not have any significant impact on recognition rates. Parameters of scale invariant features detector are set to give about 200 features per frame. The next parameter is the dictionary size used during the learning phase. We set it such that 5% of the total features are retained in the dictionary with random initialization. Finally, each component of the feature vector is uniformly weighted during dictionary creation.

5. Experiments

In order evaluate the performance of the view classification of the embodiments of the invention, we present results from two sets of experiments. First, in order to compare the performance of the present embodiments with existing state-of-the-art techniques, we present classification results using A4C, PLA, PLAB and PLAP view points (these are the same as those used in Beymer, et al.). Second, to demonstrate the capability of the embodiments to easily expand to classify more than just four views, we present results for a much larger and complicated eight-way viewpoint classification problem.

We conducted our experiments on a large collection of echocardiogram videos which contains 113 echocardiogram video sequences belonging to eight different viewpoints. Details of the database are listed in Table 1, shown in FIG. 8. The videos were captured at 320.times.240 pixel size at 25 Hz. The ECG waveform included in the video was used to extract a heart cycle synchronized at the R-wave peak. These videos were manually labeled as belonging to one of the eight views.

For the first experiment, we implemented the setup described in Beymer et al. We used four viewpoints from the data set and conducted training and testing in a leave-one-out fashion. The experiment was repeated 20 times with each time a different random initialization of the feature dictionary. Average recognition rates are reported in Table 2, shown in FIG. 9, where each row contains results using the method cited next to the method name. Results for the competing methods were taken from Beymer et al. The best result in each column is highlighted in bold. The method of the present embodiments was run with 20 frames per video and neighborhood size of 15.times.15 pixels with 15 bin histograms. The dictionary was set to have approximately 14000 features (using the heuristic mentioned earlier).

The second experiment included all the eight classes mentioned in Table 1. We conducted the training and testing in a leave-one-out fashion and repeated the experiment 20 times each with a different random initialization of the dictionary. The confusion matrix for the viewpoint classes using our method, presented in FIG. 10, yields an average recognition rate of 81%. In particular, FIG. 10 shows the Confusion Matrix for eight-way view classification. Numbers are the fraction of videos classified. Recognition rate over all videos is 81.0%. The method of the present embodiments was run with 20 frames per video and neighborhood size of 15.times.15 pixels with 15 bin histograms. The dictionary was set to have approximately 23000 features. This method can process a video with 20-30 frames in under 1 minute.

It can be noted from the results reported in Table 2 that embodiments of the invention outperform the known existing state-of-the-art methods by a convincing margin. We attribute this primarily to a better and more comprehensive use of the information present in echo videos. When compared to the results presented in Beymer et al., besides the better recognition rates, a significant advantage of the present embodiments is that time and effort consumed by manual labeling of the ASM features is not required. This translates to seamless expansion of our method to more view classes and larger training sets.

We have also presented in Table 2 a comparison to the classification method presented in Park et al. The Park et al. method is built around a Haar-like feature based Left Ventricle (LV) detector which severely limits its capability to effectively classify those views which lack LV region. Note that results presented are from a re-implementation of the method which uses Left Atrium region in place of LV for PSAB view and Haar wavelet local features (as in the original paper) for LV detection. The method of the present embodiments demonstrates better recognition rates as well as capability to include more view classes (with or without LV) over this technique. Moreover, being a boosting based method, Park et al. tends to only work well when very large amount of training data is provided.

Finally, we have compared our method to an otherwise quite effective object recognition method presented in Grauman et al. This implementation used 25 images per view class and PCA to reduce the dimension of 128-long SIFT feature vectors to 2. Classification was done using PMK based SVM with 6-D feature vectors ((x, y) location, scale, orientation, 2 PCA coefficients). This comparison is particularly important here because it demonstrates the importance of looking for good features at the right place, in our case, motion magnitude images. SIFT features have been widely used in various object and image recognition application, but as demonstrated here, a direct application of SIFT based classification is ineffective.

From the results presented for the second experiment, shown in FIG. 10, it can be noted that even when the problem of view classification is complicated by presence of multiple similar looking classes, the method of the present embodiments can still yield good results. It can be noted that the 3 new Apical views create confusion with A4C view while PSAM creates confusion with the other Parasternal views. Recognition rate over all videos is 81.0%.

Figure 11:
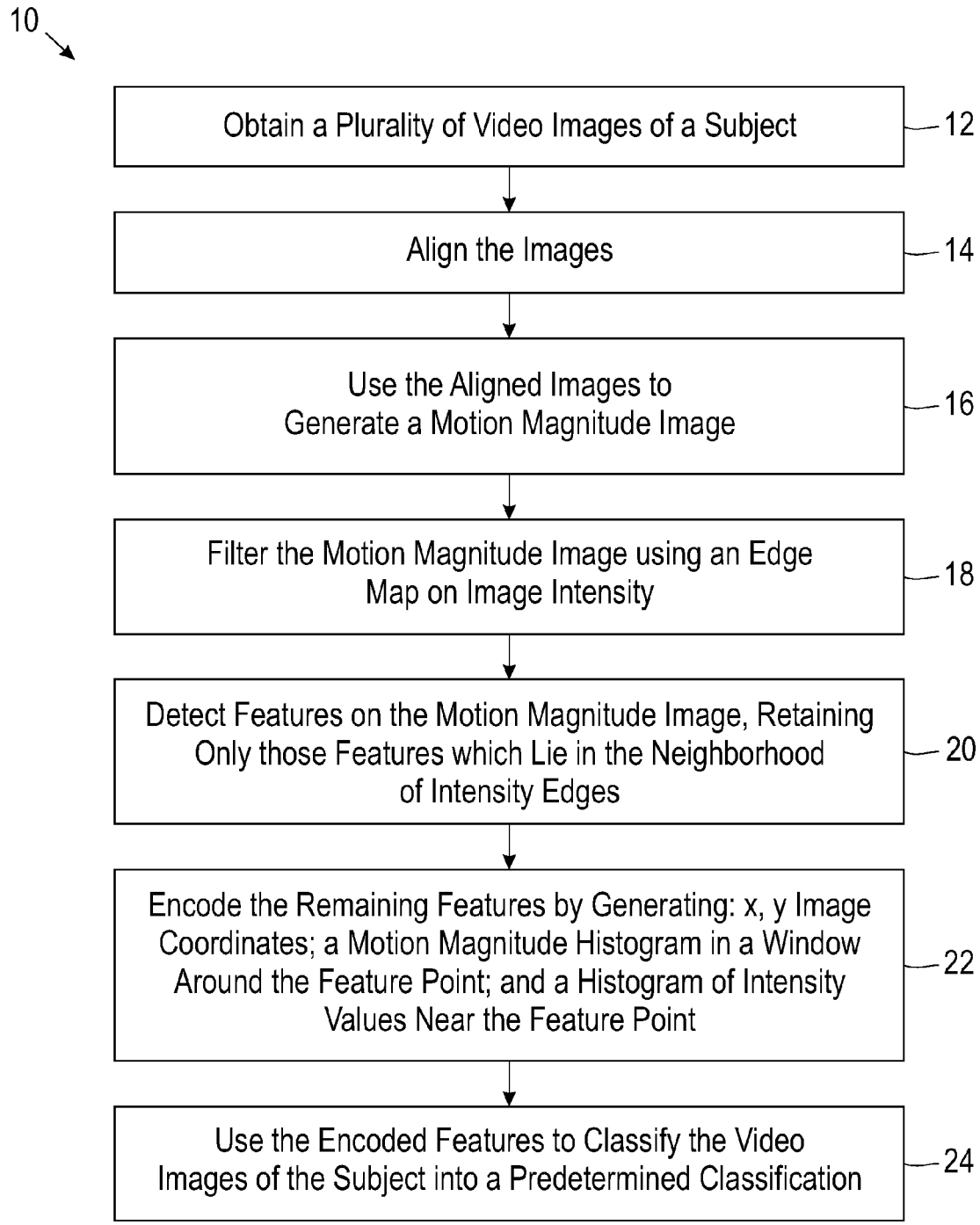
FIG. 11 shows a flow chart of a method for echocardiogram view classification in accordance with an embodiment of the invention.

FIG. 11 shows a flowchart of a method 10 for echocardiogram view classification in accordance with an embodiment of the invention. In step 12, a plurality of video images of a subject are obtained. The images are then aligned in step 14. In step 16, the aligned images are used to generate a motion magnitude image. The motion magnitude image is then filtered using an edge map on image intensity, in step 18. In step 20, features are detected on the motion magnitude image such that only those features which lie in the neighborhood of intensity edges are retained. In step 22, the remaining features are encoded by generating: x, y image coordinates; a motion magnitude histogram in a window around the feature point; and a histogram of intensity values near the feature point. The encoded features are used to classify the video images of the subject into a predetermined classification.

Embodiments of the invention introduce a novel scalable system for echocardiogram viewpoint classification which uses scale invariant features detected on edge filtered motion magnitude images and PMK based SVM. Through experiment on real data we have demonstrated the method convincingly outperforms existing state-of-the-art methods for echo view classification. We have also presented results for a more difficult eight-way view classification problem.

As can be seen from the above disclosure, embodiments of the invention provide techniques for echocardiogram view classification. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction running system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction running system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 12:
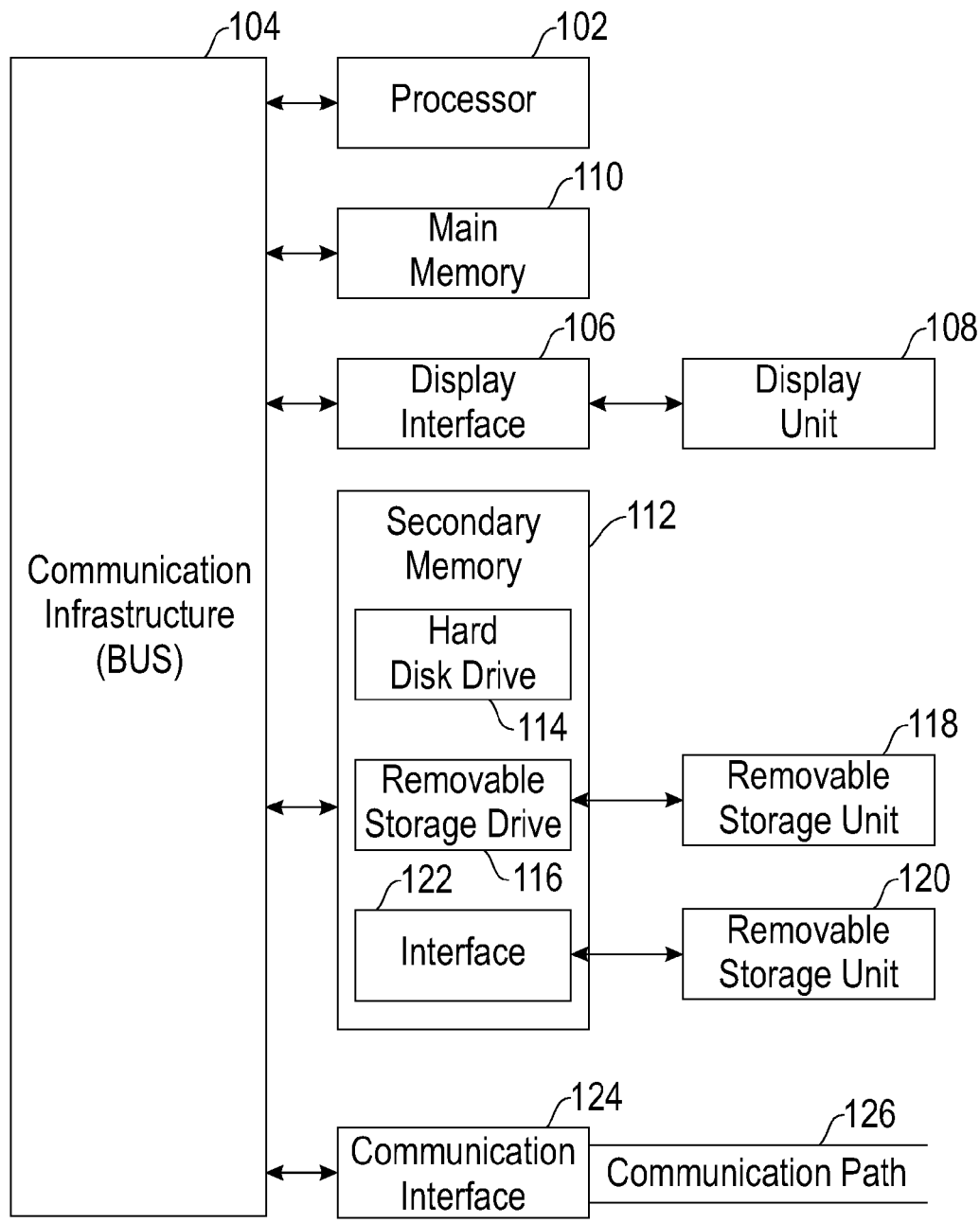
FIG. 12 shows a high level block diagram of an information processing system useful for implementing one embodiment of the present invention.

FIG. 12 is a high level block diagram showing an information processing system useful for implementing one embodiment of the present invention. The computer system includes one or more processors, such as processor 102. The processor 102 is connected to a communication infrastructure 104 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 106 that forwards graphics, text, and other data from the communication infrastructure 104 (or from a frame buffer not shown) for display on a display unit 108. The computer system also includes a main memory 110, preferably random access memory (RAM), and may also include a secondary memory 112. The secondary memory 112 may include, for example, a hard disk drive 114 and/or a removable storage drive 116, representing, for example, a floppy disk drive, a magnetic tape drive, or an optical disk drive. The removable storage drive 116 reads from and/or writes to a removable storage unit 118 in a manner well known to those having ordinary skill in the art. Removable storage unit 118 represents, for example, a floppy disk, a compact disc, a magnetic tape, or an optical disk, etc. which is read by and written to by removable storage drive 116. As will be appreciated, the removable storage unit 118 includes a computer readable medium having stored therein computer software and/or data.

In alternative embodiments, the secondary memory 112 may include other similar means for allowing computer programs or other instructions to be loaded into the computer system. Such means may include, for example, a removable storage unit 120 and an interface 122. Examples of such means may include a program package and package interface (such as that found in video game devices), a removable memory chip (such as an EPROM, or PROM) and associated socket, and other removable storage units 120 and interfaces 122 which allow software and data to be transferred from the removable storage unit 120 to the computer system.

The computer system may also include a communications interface 124. Communications interface 124 allows software and data to be transferred between the computer system and external devices. Examples of communications interface 124 may include a modem, a network interface (such as an Ethernet card), a communications port, or a PCMCIA slot and card, etc. Software and data transferred via communications interface 124 are in the form of signals which may be, for example, electronic, electromagnetic, optical, or other signals capable of being received by communications interface 124. These signals are provided to communications interface 124 via a communications path (i.e., channel) 126. This communications path 126 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 110 and secondary memory 112, removable storage drive 116, and a hard disk installed in hard disk drive 114.

Computer programs (also called computer control logic) are stored in main memory 110 and/or secondary memory 112. Computer programs may also be received via communications interface 124. Such computer programs, when run, enable the computer system to perform the features of the present invention as discussed herein. In particular, the computer programs, when run, enable the processor 102 to perform the features of the computer system. Accordingly, such computer programs represent controllers of the computer system.

From the above description, it can be seen that the present invention provides a system, computer program product, and method for implementing the embodiments of the invention. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method comprising:

Obtaining, by a processor, a plurality of video images of a subject;

aligning, by the processor, the plurality of images;

using the aligned images to generate a motion magnitude image;

filtering, by the processor, the motion magnitude image using an edge map;

detecting features on the motion magnitude image, discarding those features which do not lie in the neighborhood of edges;

encoding, by the processor, the remaining features by:
generating, x, y image coordinates for a feature point;
generating a motion magnitude histogram in a window around the feature point; and
generating a histogram of edge intensity values near the feature point; and
using the encoded features to classify the video images of the subject into a predetermined classification.

2. The method of claim 1 wherein said classifying comprises using a vocabulary-based Pyramid Matching Kernel based Support Vector Machine.

3. The method of claim 1 wherein the aligning comprises using affine transformation.

4. The method of claim 1 wherein motion magnitude image is generated using Demons algorithm.

5. The method of claim 1 wherein said video images are echocardiograms.

6. A method of classifying at least one echocardiogram video comprising:
representing, by a processor, each image from the echocardiogram video by a set of salient features;
modifying, by the processor, the image to produce an edge filtered motion magnitude image;
filtering, by the processor, the motion magnitude image using an edge map;
detecting features on the motion magnitude image, discarding those features which do not lie in the neighborhood of edges;
locating the features at scale invariant points in the edge filtered motion magnitude image; and
encoding, by the processor, the edge filtered motion magnitude image by:
generating, x, y image coordinate of a feature point;
generating a motion magnitude histogram in a window around the feature point; and
generating a histogram of edge intensity values near the feature point.

7. The method of claim 6 wherein the encoding comprises encoding the edge filtered motion magnitude image by using spatial information about the image.

8. The method of claim 6 wherein the encoding comprises encoding the edge filtered motion magnitude image by using textual information about the image.

9. The method of claim 6 wherein the encoding comprises encoding the edge filtered motion magnitude image by using kinetic information about the image.

10. The method of claim 6 wherein the locating comprises identifying the scale invariant interest points in motion magnitude that are also close to edges in the edge filtered motion magnitude image.

11. The method of claim 6 wherein the representing comprises representing the image by at least one position (x,y).

12. The method of claim 6 wherein the representing comprises representing the image by at least one histogram of local motion magnitude.

13. The method of claim 6 wherein the representing comprises representing the image by at least one histogram of local intensity.

14. The method of claim 6 wherein the representing comprises representing the image by at least one histogram of local texture.

15. The method of claim 6 further comprising classifying the image into one of a set of predetermined classifications.

16. The method of claim 15 wherein said classifying comprises using a vocabulary-based Pyramid Matching Kernel based Support Vector Machine.

* * * * *